Nov. 28, 1939.   G. A. TINNERMAN   2,181,631
FASTENING DEVICE
Filed Dec. 30, 1936
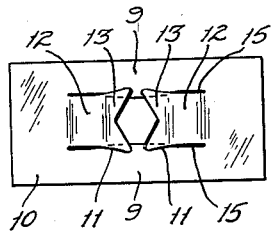
Fig. 1
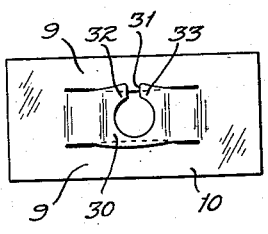
Fig. 8
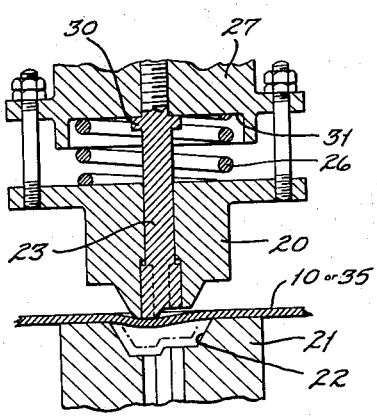
Fig. 5
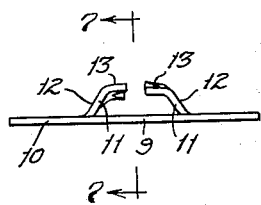
Fig. 2
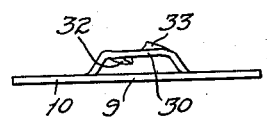
Fig. 9
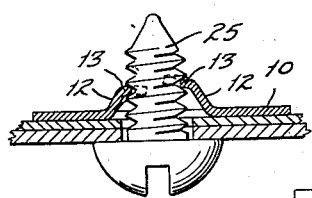
Fig. 3
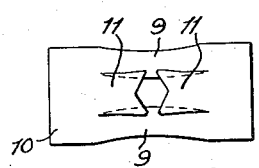
Fig. 10
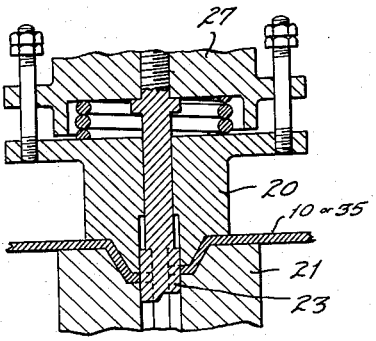
Fig. 6
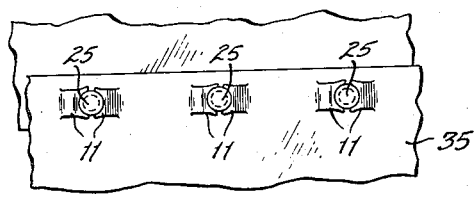
Fig. 4
Fig. 7
INVENTOR.
GEORGE A. TINNERMAN
BY Bates, Golrick & Teare
ATTORNEYS Patented Nov. 28, 1939

2,181,631

UNITED STATES PATENT OFFICE 2,181,631

FASTENING DEVICE

George A. Tinnerman, Rocky River, Ohio, assignor to Albert H. Tinnerman, Cleveland, Ohio Application December 30, 1936, Serial No. 118,216

7 Claims. (Cl. 85—32)

This invention relates to threadless fasteners, which are made of sheet metal. Heretofore, such fasteners have been almost universally made from spring steel or from an expensive material having spring-like characteristics, such as that known in the trade as spring bronze. The spring-like characteristics have been regarded as necessary to impart adequate mechanical strength to the fastener, so as to resist the tendency of that portion adjacent the belt aperture to pull through, whenever a bolt is tightened to the utmost extent. The hardening operation to which the metal must be subjected, however, in order to obtain the spring-like characteristics has increased the cost of construction and has made it impractical to form fasteners in the sheet metal panels of which many commercial articles are made.

An object of my invention is to make a threadless fastener that can be made from ordinary commercial quality cold rolled steel and that possesses the holding power of fasteners made from spring steel. In addition, the invention contemplates a shape of fastener, which enables it to be formed out of sheet panels that comprise an integral part of an assembly, such as automobile bodies, gas or electric ranges, furnace jackets, metal furniture, metal partitions, refrigerator cabinets, radio chassis, interior train panels, airplane cowlings, lamp bases, signs or many kindred types of assemblies which employ metal sheet materials, as a part of their completed form.

A further object of the invention is to make a fastener which may be constructed independently of the panel of which it is intended to be used so that it can be suitable for holding assembly panels which are made of such materials as fibre board and glass or vitreous coated metal sheets.

Referring now to the drawing, Fig. 1 is a top plan view of a fastener embodying my invention; Fig. 2 is a side view of a fastener shown in Fig. 1; Fig. 3 is a longitudinal vertical section taken through the fastener of Fig. 1 and showing it in use with a threaded member; Fig. 4 is a top plan view of a panel having fasteners embodying the present invention formed therein; Fig. 5 is a vertical section through a forming tool illustrating a step in the forming of the fastener; Fig. 6 is a section similar to that in Fig. 5 and showing another step in the formation of the fastener; Fig. 7 is a cross sectional view taken on the line 7—7 in Fig. 2; Fig. 8 is a top plan view of a fastener having a modified form of a bolt opening therein, Fig. 9 is a side view of a fastener shown in Fig. 8, and Fig. 10 is a top plan view of a fastener embodying a modified form of construction.

The fastener which I have illustrated, has been designed to have sufficient strength even though made out of cold rolled steel to withstand the endwise pull which is exerted during the tightening operation of the threaded holding member. The fastener is adapted to be made either in individual units or in the form of an impression on a sheet panel. Thus, in Fig. 1, the individual fastener is shown as having a body portion 10 from which thread engaging portions 11 are formed. These portions, in the form shown, include surfaces 12 which are inclined to the body portion and which terminate in substantially flat portions 13 that are bent inwardly out of the plane of the inclined surfaces 12 and are pitched to correspond to the helix of a threaded member with which the fastener is intended to be used.

In the preferred arrangement, the portions 13 have a width that is substantially equal to the depth of the thread on the bolt with which the fastener is intended to be used, as a result of which the force exerted during the tightening operation does not impose an objectionable bending moment upon the thread engaging part of the fastener. The portions 12 may be either substantially flat or slightly curved transversely, but in either case, the surface is such that its intersection by any plane passing at a right angle through the body portion, and in a direction in which the tongues extend, would be a straight line.

In making the thread engaging portion, I prefer to utilize a tool which will slit the stock along parallel lines 15, and then deform that portion which lies between the slits 15. The slitting and deforming operation may be performed by dies 20 and 21 respectively; the die 21 having a cavity 22 into which the metal is adapted to be pressed by the die 20. This operation imparts toughness to the metal by cold working it, the operation comprising a stretching as well as a forming operation, as a result of which the area of the deformed metal is larger than the area of the opening from which it has been obtained.

Fig. 5 shows the position of the dies during the deforming operation while Fig. 6 shows the position of them during the piercing operation. In Fig. 6, the deformed metal fills the cavity in the lower die while the punch 23 which is positioned centrally within the die 20 extends through the metal, thereby shearing off a part of it, so as to form the aperture, through which a threaded fastening member 25 may extend.

The die 20 may have a yieldable connection, by means of a spring 26, with a plunger 27, that is adapted to be reciprocated in any well known manner. The spring 26 is sufficiently strong that the metal is deformed from the body portion of the fastener and forced against the wall of the cavity 22 before the punch 23 pierces the metal to form the thread receiving aperture. A convenient way of supporting the punch 23 within the carrier or plunger 27, is to provide a shoulder 30 which abuts the carrier against the wall 31, which forms the seat for the spring 26. The die construction shown may be satisfactorily used either for forming individual fasteners or for making the fastener impressions in the body of a sheet metal panel. In Fig. 4, for example, I have shown a panel 35, as having the fastener impressions indicated at 11 formed therein at spaced intervals.

In Fig. 7, I have shown a cross-sectional view through the fastener from which it will be apparent that the tongues are wider adjacent the ends thereof than the space from which the metal was deformed. This may be accomplished either by pressing the metal with sufficient force to make it flow laterally, or by bowing inwardly the longitudinal connecting strips 9 on the body of the fastener as is shown in Fig. 10. In either case, the connecting strips 9 provide an abutment as shown by the broken lines 11a in Fig. 7, against which the ends of the tongues may engage in case they are drawn to an excessive degree during the bolt-tightening operation. In this way, the tongues are prevented from being pulled through the fastener at any time.

In Figs. 8 and 9, I have shown a modification of my invention wherein the bolt engaging portion comprises a strip 30 that is formed from the base in the same manner as heretofore described in connection with the fastener of Fig. 1, but wherein the bolt receiving opening is formed by severing the strip only at one edge as at 31. Such severing operation forms the tongues 32 and 33 which may be bent in opposite directions so as to make the marginal edge of the bolt receiving opening in the form of a helix that corresponds to that on the thread with which the fastener is intended to be used.

A fastener made in accordance with the present invention has sufficient strength to resist the tendency of the threaded member to pull through, wherefore it can be made of cold rolled stock and used satisfactorily with a threaded holding member that is commercially known as a wood screw. The cold working of the metal, resulting from the forming and stretching operation, imparts a degree of hardness to the thread engaging portions of the fastener which makes it suitable for use in impressions that are made in multiple from an unhardened sheet metal panel. Thus, I have greatly extended the usefulness of threadless fasteners in automotive and cabinet assembly. A further advantage of my invention is the fact that the forming tools may be satisfactorily used either for making individual fasteners or for making individual impressions in a sheet metal panel upon a single stroke of the reciprocating die.

I claim:

1. Fastening means having a base portion and a pair of thread engaging portions that are formed integrally with the base portion and that are formed from one side thereof, the thread engaging portions being wider at their free ends than the space from which they were formed.

2. Fastening means comprising a sheet metal body having a pair of arms formed therefrom and extending upwardly therefrom and inwardly towards each other, each arm having the free end thereof bent inwardly to engage the thread of a bolt, the bent portion having a width substantially equal to the depth of the thread on a bolt with which the fastener is intended to be used, and each arm being wider at the thread engaging end thereof than the space from which it was formed.

3. Fastening means having a base portion and having a strip formed from one side thereof, the strip having an opening therein for receiving a threaded member, and the strip being severed between the opening and only one edge thereof so as to provide two tongues, one of the tongues being bent downwardly and the other upwardly so as to make the marginal edge of the opening in the shape of a helix that conforms to the helix of a thread on the bolt with which the fastener is intended to be used.

4. Fastening means comprising a sheet metal body having a thread engaging portion formed integrally therewith and from one side thereof, the thread engaging portion being wider in some portions thereof than the space from which it was formed.

5. Fastening means comprising a sheet metal body having a thread engaging portion formed therefrom and extending upwardly from one side thereof, the marginal edge of the thread engaging portion being bent out of the plane of the upwardly extending portion, and the width of the marginal bent portion being substantially equal to the depth of the thread on a bolt with which the fastening means is intended to be used.

6. A fastening device comprising a body, a tongue struck from said body, said body having an opening therethrough at the free end edge of said tongue, and shoulders on the side edges of said tongue overlapping said body whereby said shoulders will engage said body upon the tightening of a bolt inserted through the opening in said device to prevent the free end of the tongue from being drawn into or through the plane of the body during application of the device.

7. A fastening device comprising a body, a tongue integral with said body, said body having an opening therethrough beneath the free end edge of said tongue, and shoulders on the side edges of said tongue overlapping said body whereby said shoulders will engage said body upon the tightening of a bolt inserted through the opening in said device to prevent the free end of the tongue from being drawn into or through the plane of the body during application of the device.

GEORGE A. TINNERMAN.